UNITED STATES PATENT OFFICE.

WILHELM VENIER, OF HADERSDORF-WEIDLINGAN, AUSTRIA-HUNGARY, ASSIGNOR OF ONE-HALF TO M. SCHMID & SÖHNE, OF VIENNA, AUSTRIA-HUNGARY.

REFRIGERATING BODY.

SPECIFICATION forming part of Letters Patent No. 666,829, dated January 29, 1901.

Application filed May 12, 1900. Serial No. 16,461. (No specimens.)

*To all whom it may concern:*

Be it known that I, WILHELM VENIER, a resident of Hadersdorf-Weidlingan, Austria-Hungary, have invented certain new and useful Improvements in Refrigerating Bodies, of which the following is a specification.

The principal object of my present invention is to provide a refrigerating body or mass adapted to be rapidly congealed or reduced in temperature to or about the freezing-point of water and similar liquids and at the same time capable of storing the cold thus generated and permitting the cold to be given off gradually over a long period of time.

The body or mass which embodies my invention consists of three essential elements, to wit: first, a liquid, such as water, hydrate of chlorin, oleic acid, ($C_{18}H_{34}O$,) oleine, $C_{18}(H_{33}O_3)C_3H_5O_3$, or similar liquids the freezing-point of which is approximately 0° centigrade and capable of ready absorption by a porous body; second, a porous or absorbent medium—such, for instance, as infusorial earth—capable of absorbing the liquid to be congealed, and, third, a binding material, such as cement, adapted to bring the particles of absorbent medium into a coherent mass without impairing too greatly the absorbent properties of the medium.

In the carrying out of my invention the liquid, if water, may contain a percentage of certain aqueous salts up to about ten per cent., these salts being by preference calcium chlorid ($CaCl_2$) or ammonium chlorid, ($NH_4Cl$.)

The materials may be combined in suitable proportions, those which have given good results being as follows: infusorial earth, one part, by weight; cement, one part, by weight, and water, five to six parts, by weight, or infusorial earth, one part, by weight; cement, one part, by weight, and five to ten per cent. aqueous solution of chlorid of calcium, ammonium chlorid, or similar salt, five to six parts, by weight. In either of these formulæ the water or the aqueous solutions of the salts may be replaced by hydrate of chlorin, oleic acid, or oleine in about the same proportions. The mass or body thus obtained possesses peculiar properties when subjected to the action of a cooling or refrigerating agent—such, for instance, as ammonia, carbonic acid, or sulfurous acid. The refrigerating agent, acting either from the interior outward or from the exterior inward of the mass, will quickly freeze the liquid to be congealed, the liquid being stored up in the pores of the absorbent material and very finely separated in minute particles. When, however, the liquid has been congealed and placed in a receptacle to be cooled, the thawing action on the mass is immeasurably retarded over what takes place in a solid congealed mass of liquid only.

In the formation of the body or mass the absorbent material (infusorial earth, for instance) is mixed with the binding material (cement) and slightly moistened to set the materials in a mass. The congealing liquid is then added to the mass and is quickly absorbed by the infusorial earth.

Having thus described the nature and object of my invention, what I claim as new, and desire to secure by Letters Patent, is—

1. A refrigerating mass or body, comprising an absorbent material bound together by a suitable binding agent, and a congealing liquid adapted to be absorbed by the absorbent material, substantially as and for the purposes described.

2. A refrigerating mass or body, comprising infusorial earth, cement and a congealing liquid, such as water, hydrate of chlorin, oleic acid or the like, in substantially the proportions stated, as and for the purposes described.

In testimony that I claim the foregoing as my invention I have signed my name in presence of two subscribing witnesses.

WILHELM VENIER.

Witnesses:
 ALVESTO S. HOGUE,
 AUGUST FUGGER.